Oct. 13, 1936.   J. GSTYR   2,057,303
METHOD OF GRINDING CUTTER BLADES
Original Filed Dec. 24, 1932   2 Sheets-Sheet 1
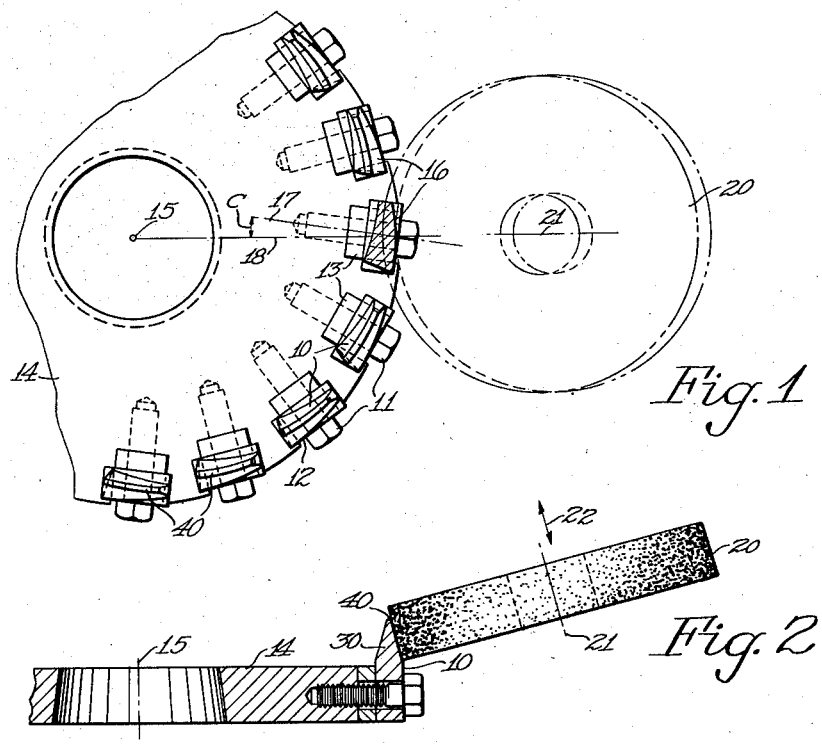
Fig. 1
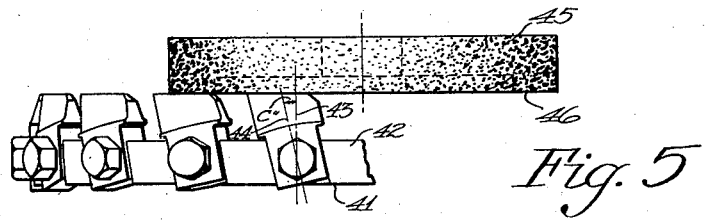
Fig. 2
Fig. 5
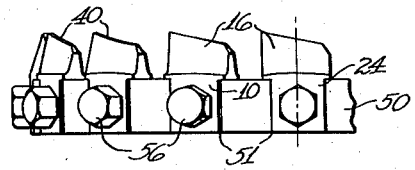
Fig. 7
Inventor
Joseph Gstyr
By
B. M. Schlesinger
Attorney

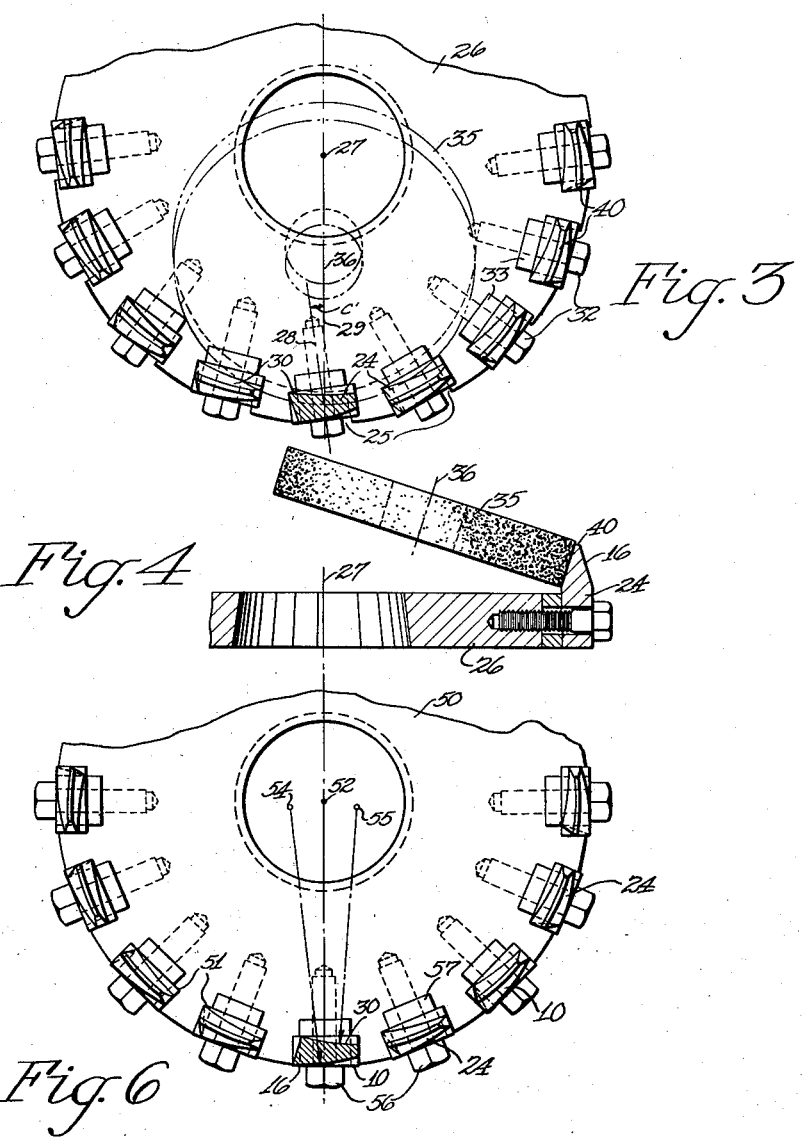

Patented Oct. 13, 1936

2,057,303

UNITED STATES PATENT OFFICE 2,057,303

METHOD OF GRINDING CUTTER BLADES

Joseph Gstyr, Rochester, N. Y., assignor to Gleason Works, Rochester, N. Y., a corporation of New York Original application December 24, 1932, Serial No. 648,759. Divided and this application July 13, 1934, Serial No. 734,983. In Great Britain November 11, 1933

12 Claims. (Cl. 51—278)

The present invention relates to the relief-grinding of tools for cutting longitudinally curved tooth gears and particularly to the relief-grinding of blades of face-mill gear cutters. This application is a division of my pending application Ser. No. 648,759 for Gear cutter, filed Dec. 24, 1932 which has now matured into Patent No. 1,969,841, issued August 14, 1934.

The primary purpose of the invention is to permit tools for cutting longitudinally curved tooth gears and particularly face-mill gear cutter blades to be manufactured more cheaply and with a better surface-finish.

To cut efficiently, any metal-cutting tool must be provided with clearance back of its cutting edge. The blades of a face-mill gear cutter are relieved, therefore, on both the sides and tops back of their side and top cutting edges.

Although other methods of relief-grinding face mill cutter blades have been suggested, the standard practice up to the present has been to mount the blades in a rotary head and to effect the relieving operation by imparting a reciprocatory relieving motion between the grinding wheel and head as each blade rotates past the wheel. While this standard method is, in general, satisfactory, there is a limit at which the relief-grinding machines can be operated, because if they are operated at high speed, vibrations are liable to be set up by the reciprocating parts. Moreover, there is an inherent time-loss in this standard method due to the necessity for withdrawing the wheel, after each blade has passed beneath it, in order to bring the wheel into position to relieve the next blade.

The present invention eliminates both these draw-backs of the standard method by eliminating the reciprocatory relieving motions. The proper cutting clearance is obtained in the present invention by positioning the blades obliquely in a rotary head, that is, at an angle to the position which the blades would occupy when cutting, and by then simply rotating the head to move the blades in a circular path past the rotating grinding wheel. No reciprocating motion is required or used. The amount of clearance obtained is determined by the obliquity of setting of the blades during grinding and clearance is achieved because, when the blades are used, they are mounted in a different position from that in which they were ground.

Thus to secure clearance on the sides of the blades of a face-mill gear cutter, which is to cut in an intermittent indexing process, the blades are mounted in a rotary head non-radially of the axis of the head and ground in that position. In use, these blades are mounted radially of the axis of the cutter head.

Cutting clearance can also be provided on the tops of the same blades, by mounting the blades out of parallelism with the axis of the head and grinding them in that position and by then adjusting them for cutting so that they are parallel to the axis of the cutter head.

The present invention permits of grinding the blades of a face-mill gear cutter much more rapidly than in the previous relieving methods, since it is, in effect, a surface grinding operation and further one in which no timed reciprocation of cutter head or grinding wheel is required. With the present method, too, a better finish is obtained on the ground side-surfaces of the blades than with previous relief-grinding methods. This improvement in finish can be still further enhanced by imparting a reciprocating movement to the grinding wheel in addition to its rotation. This last-named reciprocating movement is not to be confused with the reciprocating motion employed in the standard relieving process of the prior art. It is not timed with the rotation of the cutter head and need be only very slight since it is a surface-finishing motion and not a wheel-positioning movement.

Blades of cutters ground by the present process have side surfaces which are surfaces of revolution, whereas the side surfaces of blades ground by the standard process above referred to are helical. The top surfaces of blades ground according to the method of the present invention are plane, whereas the top surfaces of blades ground according to the prior standard process are helical like the side surfaces of those blades.

The principal objects of the invention have been mentioned. Other objects of the invention will be apparent hereinafter from the specification and from the recital of the appended claims.

In the drawings:

Figures 1 and 2 are a fragmentary plan view and a fragmentary sectional view, respectively, illustrating diagrammatically how the outside surfaces of the blades of a face-mill gear cutter are relief-ground according to the present invention;

Figures 3 and 4 are similar views illustrating the relief-grinding of the inside surfaces of the blades;

Figure 5 is a fragmentary elevational view, illustrating the method of grinding the tops of blades by the process of the present invention;

Figure 6 is a fragmentary plan view of a face-mill gear cutter having blades manufactured according to the present invention; and Figure 7 is a fragmentary side elevation of this cutter.

In face-mill gear cutters, ordinarily, alternate blades have opposite side cutting edges. One blade will have an outside edge and the next blade an inside cutting edge. In Figures 1 and 2, the new method of relief-grinding is illustrated in connection with the grinding of the outside surfaces of outside cutting blades of a face-mill gear cutter of the intermittent indexing type, while in Figures 3 and 4, the new method is illustrated in connection with the grinding of inside blades of such a cutter.

Referring first to Figures 1 and 2, 10 designates the outside blades of a face-mill gear cutter and 16 designates the outside surfaces of these blades. To relief-grind the outside surfaces of the blades 10, the blades are secured in a rotary head 14 which is different from the head in which the blades are mounted for cutting. This head 14 is provided with a series of rectangularly-shaped blade-receiving slots 12, which are non-radial of the axis 15 of the head 14, and the blades are secured in these slots by bolts 11. The angle $c$ of obliquity or offset of the center line 17 of each slot relative to a line 18 radial of the axis 15 of the head, is determined by the amount of cutting clearance desired back of the outside surfaces 16 of the blades. Shims 13 may be used to adjust the positions of the blades radially of the axis 15 of the head.

To grind the outside surfaces 16 of the blades, a cylindrical grinding wheel 20 may be used. The wheel is adjusted so that the line along which it contacts with the surface 16 lies in a plane containing the axis 15 of the head and is inclined to the axis 15 of the rotary head 14 at an angle corresponding to the pressure angle of the outside cutting edges of the blades so as to grind the outside surfaces to the required pressure angle.

The relief-grinding operation is effected by rotating the head 14 and wheel 20 on their respective axes to carry the cutting blades 10 past the rotating grinding wheel 20. The grinding wheel may be fed toward the axis 15 of the head, during grinding, to remove the desired amount of stock from the blades. Very smooth surfaces will be produced on the outsides of the blades by this grinding operation for it is, in effect, a surface grinding operation. The quality of the finish obtainable in my process can be still further improved, however, by imparting a slight reciprocating movement to the grinding wheel as it rotates on its axis. This movement should be in the direction of the line of contact between the grinding wheel and the outside surfaces 16. In the case of the grinding wheel 20, it would be in the direction of the axis 21 of the wheel, as indicated by the arrow 22. This reciprocating movement of the wheel is in no wise timed to the rotation of the head 14 and only a slight reciprocating movement is required to produce a high polish on the blades.

Where blades having a positive pressure angle are being ground, the line of contact between the grinding wheel and the blade is inclined to the axis of the rotary blade-carrying head, as shown in Figures 1 and 2, and the ground side surfaces of the blades will be sections of a cone. The axis of this cone will coincide with the axis 15 of the rotary head 14 in which the blades are carried during grinding. One of the blades 10 is shown in section in Figure 1 in a plane perpendicular to the axis 15 of the rotary head 14. The intersection of the outside surface 16 with this plane is, because of the method of grinding, a circular arc concentric with the axis 15 of the head.

Where cutting blades having outside surfaces of zero pressure angle are to be relief-ground, the grinding wheel will be positioned so that the line of contact between the wheel and the blades will be parallel to the axis of the blade-carrying head and then the surfaces ground on the blades will be sections of a cylinder whose axis coincides with the axis of the head.

Referring now to Figures 3 and 4, 24 designates the inside cutting blades of a face-mill gear cutter and 30 the inside surfaces of these blades. To grind these surfaces 30 by the present invention, the blades 24 are secured in slots 25 of a head 26 whose slots 25 are non-radial of the axis 27 of the head 26, but are oppositely directed from the slots 12 of the head 14. The angle $c'$ between the center line 28 of the slots 25 and the line 29 radial of the axis 27 is determined by the clearance angle desired on the inside surfaces 30 of the cutting blades.

The blades 24 are secured in the head 26 by bolts 32 and shims 33 may be employed to adjust the blades to the proper distance from the axis 27 of the head.

The process for grinding the inside surfaces is similar to that for grinding the outside surfaces. A grinding wheel 35, of which, if desired, may be identical with the grinding wheel 20, is adjusted into operative relation with the inside surfaces of the blades and in such manner that its line of contact with the blades is inclined to the axis 27 of the head 26 at an angle corresponding to the pressure angle of the inside cutting edges of the blades. Then, the head 26 is rotated on its axis to pass the inside surfaces of the blades across the operating surface of the rotating grinding wheel 35. As before, the blades can be ground to the required depth by feeding the grinding wheel in a direction perpendicular to the axis 27 of the head. If a high polish is desired on the inside surfaces, this can be obtained, as before, by imparting a slight reciprocating movement to the grinding wheel 35 in the direction of its axis 36.

The inside surfaces of the blades will be conical if the line of contact between the grinding wheel and the blades is inclined to the axis 27 of the cutter, as shown, while if the grinding wheel is so positioned that the line of contact between the wheel and blades is parallel to the axis 27 of the head, as required for grinding inside surfaces of zero pressure angles, the inside surfaces will be cylindrical. In either case, the surface of revolution ground on the insides of the blades, whether conical or cylindrical, will be coaxial with the axis of the head in which the blades are secured during grinding.

In Figure 5, there is shown the preferred method of grinding the top surfaces 40 of both the inside and outside blades. Here the blades are secured in slots 41 of a rotary head 42 whose slots 41 are non-parallel to the axis 43 of the head 42. The angle of inclination $c''$ of the center line 44 of each slot 41 to the axis 43 is determined by the clearance angle desired back of the top cutting edges of the blades.

The top surfaces of the blades are ground with a grinding wheel 45 having a plane operating surface 46 which, in operative position, is perpendicular to the axis 43 of the head 42. The top surfaces of the blades are ground by rotating the head 42 to carry the top surfaces of the blades across the operating face of the rotating grinding wheel 45.

When the top surfaces of the blades are ground in the manner just described, these top surfaces 40 will be plane surfaces. It will be realized, of course, that in grinding the top surfaces of the blades, it is not necessary to use a rotary blade-carrying head. The top-clearance could be just as well ground on the blades by positioning them at the correct angle and moving them in a straight line across the face of the rotating grinding wheel 45. The rotary head 42 simply provides a convenient means for carrying the blades across the operating surface of the grinding wheel.

Since the cutting blades cut on one side only it is only necessary to grind each blade on one side, but it may be desirable for accuracy and appearance in many instances to grind them on both sides. It will be assumed for the sake of illustration that the blades 10 and 24 have been ground on both sides by first positioning them in the head 14 and then in the head 26.

After the side and top surfaces have been ground on the blades, they are assembled in their own head 50 for use. The slots 51 of this head are radial of the axis 52 of the head and parallel to this axis, as clearly shown in Figures 6 and 7. When the blades are positioned in this head, then, the side and top surfaces of the blades will have proper cutting clearance back of the side and top cutting edges. The cone axis 54 of the outside surface 16 of each blade is then offset from but parallel to the axis 52 of the cutter head and the cone axis 55 of the inside surface 30 of each blade is also offset from and parallel to the axis 52 of the cutter head. The two axes 54 and 55 are offset on opposite sides of the axis 52 of the head. The blades 10 and 24 are secured in the head 50 by bolts 56, while shims 57 may be used to adjust the blades in the head.

While the invention has been described in connection with the grinding of the blades of a face-mill gear cutter which is to operate in an intermittent indexing process, it will be understood that it is equally applicable to the grinding of other forms of tools for cutting longitudinally curved tooth gears, as, for instance, swinging cutting tools and blades of a face-mill hobbing cutter, that is, of a face-mill gear cutter which is to operate in a continuous indexing process. In any case, the angle of obliquity of setting of the blades in the dummy head will be determined by the required cutting clearance.

Moreover, while the invention has been illustrated in connection with the relief-grinding of blades by setting them obliquely in a rotary head, it will be understood that the invention is not limited to a process in which the blades are so arranged. Thus, it is conceivable that if the blades of a face-mill gear cutter were offset, that is, non-radial, of the axis of the cutter head, such blades could be relief-ground according to the process of the present invention by positioning them radially in the relieving head. The only requirement is that the positions of the blades during relief-grinding be different from their positions during cutting so that the proper cutting clearance may be ground on the blades.

The blades shown in the drawings have straight cutting edges and their cutting portions are of trapezoidal cross-section, as clearly shown in Figures 2 and 4. It will be understood, however, that the invention is not limited to the grinding of such blades, since blades having curved cutting edges may be relief-ground also, by the present process. To grind such blades, the grinding wheels will be dressed to provide operating surfaces which are of complementarily curved profile.

In general, it may be said, that the invention is capable of various embodiments and that the present application is intended to cover any adaptations, uses, or modifications of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. The method of grinding clearance on the side surfaces of face-mill gear cutter blades which comprises mounting said blades around the periphery of a rotary head so that the blades project beyond one side of the head and are inclined sidewise with reference to the positions they would occupy during cutting, by an angle determined by the cutting clearance desired on one side of the blades, bringing a rotary grinding wheel into engagement with the blades and rotating the grinding wheel on its axis while producing a relative rotary movement between the wheel and head about the axis of the head, thereby to grind surfaces on the described sides of the blades which are coaxial of the head.

2. The method of relieving a blade of a face-mill gear cutter which comprises grinding the side surface of the blade while moving the blade in a circular path past a rotating grinding wheel while holding the blade so that it extends in a direction parallel to but non-radial of the axis about which it is moved, and grinding the top surface of the blade while moving the blade in a circular path past a rotating grinding wheel, which has an operating surface lying in a plane perpendicular to the axis about which the blade is moved, and while maintaining the blade tilted out of parallelism with said axis at an angle determined by the angle of top-relief desired on the blade.

3. The method of grinding clearance on the side surfaces of face-mill gear cutter blades which comprises mounting said blades in a rotary head so that the blades are inclined sidewise, with reference to the positions they would occupy during cutting, by an angle determined by the cutting clearance desired on one side of the blades, and so that the tip surfaces of the blades are inclined to a plane perpendicular to the axis of the head by an angle equal to the top clearance angle of the blades, bringing a rotary grinding-wheel into engagement with the blades and rotating the grinding-wheel on its axis while producing a relative rotary movement between the wheel and the head about the axis of the head, thereby to grind side surfaces on the described sides of the blades which are coaxial of the head.

4. The method of grinding clearance on the side surfaces of face-mill gear cutter blades, which comprises mounting said blades in a rotary head so that the blades extend parallel to the axis of the head but are inclined sidewise, with reference to the positions they would occupy during cutting, by an angle determined by the cutting clearance desired on one side of the blades, bringing the rotary grinding-wheel into engagement with the blades and rotating the grinding-wheel on its axis while producing a relative rotary movement between the wheel and head about the axis of the head thereby to grind side surfaces on the described sides of the blades which are coaxial of the head.

5. The method of grinding clearance on the side surfaces of face-mill gear cutter blades which are adapted to be mounted in a cutting-head with their side surfaces inclined to a surface of revolution coaxial with the head, which comprises mounting the blades in a rotary head so that the blades extend parallel to the axis of the head but are inclined sidewise, with reference to the positions they would occupy during cutting, by the angle of the cutting clearance desired on one side of the blades, and finish-grinding said side of the blades to a conical surface coaxial of the second head.

6. The method of grinding clearance on one side of face-mill gear cutter blades, which in use are adapted to be mounted in a cutting head to project beyond one side face of the cutting head with their side surfaces inclined to a surface of revolution coaxial with the cutting head, which comprises mounting said blades in a rotary head so that the blades are mounted around the periphery of the rotary head and project beyond one side face of the rotary head and are inclined sidewise, with reference to the positions they would occupy during cutting, by the angle of the cutting clearance desired on one side surface of the blades, and finish-grinding said side surfaces of the blades to a surface of revolution coaxial with said rotary head.

7. The method of grinding clearance on one side of face-mill gear cutter blades, which are adapted to be mounted in a cutting head with their side surfaces inclined to a surface of revolution coaxial with the head, which comprises mounting said blades in a rotary head so that the blades extend parallel to the axis of the head but are inclined sidewise, with reference to the positions they would occupy during cutting, by the angle of cutting clearance desired on one side of the blades, and finish-grinding said side surfaces of the blades to a surface of revolution coaxial with said head.

8. The method of grinding clearance on a side surface of a blade of a face-mill gear cutter which in use is adapted to be mounted radially of the cutter axis and to project beyond one side face of the cutter, which comprises mounting the blade in a rotary head to project beyond one side face of the rotary head and be non-radial of the axis of the rotary head so that the blade is inclined to the position it would occupy in use by an angle determined by the side clearance desired on one side of the blade, and grinding said side of the blade as a surface of revolution coaxial with the head in which it is ground.

9. The method of grinding clearance on one side surface of face-mill gear cutter blades which comprises mounting said blades circularly in a rotary head so that the blades extend in a direction generally parallel to the axis of the head and the side surfaces to be ground are inclined sidewise to the positions, which they are to occupy in use, by the desired angle of cutting clearance, bringing a grinding wheel into operative relation with the blades, and rotating the head and wheel on fixed axes while maintaining the head and wheel against relative movement in the direction of the axis of the head to grind side surfaces on the blades which are surfaces of revolution coaxial with the head.

10. The method of grinding clearance on one side surface of face-mill cutter blades which comprises mounting said blades circularly in a rotary head so that the side surfaces to be ground are inclined sidewise to the positions, which they are to occupy in use, by the desired angle of cutting clearance, bringing a grinding wheel, whose operative surface is of straight profile, into operative relation with the blades, and rotating the head and wheel on fixed axes, to grind side surfaces on the blades which are straight-profiled surfaces of revolution coaxial with the head.

11. The method of grinding clearance on one side surface of face-mill gear cutter blades which comprises mounting the blades circularly in a rotary head so that the blades extend in a direction generally parallel to the axis of the head but are each correspondingly inclined sidewise to the position, which each is to occupy in use, by the angle of cutting clearance desired to be ground on one side of the blades, positioning a disc grinding wheel in operative relation with this side of the blades with the axis of the wheel inclined to the axis of the head, and rotating the head and wheel on their respective axes while maintaining the head and wheel against relative movement in the direction of the axis of the head to grind side surfaces on the blades which are surfaces of revolution coaxial with the head.

12. The method of grinding clearance on one side surface of face-mill gear cutter blades which comprises mounting the blades circularly in a rotary head so that the blades extend in a direction generally parallel to the axis of the head but are each correspondingly inclined sidewise to the position, which each is to occupy in use, by the angle of cutting clearance desired to be ground on one side of the blades, positioning a cylindrical grinding wheel of straight profile in operative relation with this side of the blades with the axis of the wheel inclined to the axis of the head and rotating the wheel and head on their respective axes while maintaining the wheel and head against relative movement in the direction of the axis of the head to grind side surfaces on the blades which are conical surfaces of revolution coaxial with the head.

JOSEPH GSTYR.